United States Patent Office 3,467,635
Patented Sept. 16, 1969

3,467,635
COPOLYMERS OF TETRAFLUOROETHYLENE AND OLEFINS CURABLE TO ELASTOMERS
Wallace Raymond Brasen, Claymont, and Charles Spencer Cleaver, Wilmington, Del., assignors to E. I. du Pont de Nemours and Company, Wilmington, Del., a corporation of Delaware
No Drawing. Continuation-in-part of application Ser. No. 455,940, May 14, 1965, which is a continuation-in-part of application Ser. No. 407,860, Oct. 30, 1964. This application Sept. 8, 1966, Ser. No. 577,799
Int. Cl. C08f 15/40, 15/06
U.S. Cl. 260—80.76
14 Claims

ABSTRACT OF THE DISCLOSURE

Copolymers of tetrafluoroethylene units, olefin units and optional cure-site units, the molar ratio of said tetrafluoroethylene units to said olefin units being about 1:0.6–1.2, said olefin units being selected from (1) 50 to 100 mole percent propylene, butene-1 or mixtures thereof together with from 0 to 50 mole percent ethylene or isobutylene, and (2) ethylene and isobutylene in about 1:1 molar proportion.

---

This application is a continuation-in-part of U.S. application S.N. 455,940, filed May 14, 1965, which is a continuation-in-part of U.S. application S.N. 407,860, filed Oct. 30, 1964, both now abandoned.

This invention relates to new elastomers and more particularly, to elastomers derived from tetrafluoroethylene and certain olefinic compounds, to compositions derived from these monomers which are convertible to elastomers, and to processes for preparing the new elastomers.

Copolymers of tetrafluoroethylene with ethylenically unsaturated monomers are known, see for example U.S. Pat. No. 2,468,664 and British Pat. No. 594,249. The specific copolymers exemplified in these patents and the properties disclosed indicate that when about one-half or more of the units present are derived from tetrafluoroethylene, the resultant copolymers are tough, non-resilient, high-melting plastics. These patents also teach that when the tetrafluoroethylene units do not predominate, the resultant copolymers are low melting thermoplastic resins. It has only recently been reported in Journal of Polymer Science, vol. 2, pp. 2235–2243 (1964) that a certain copolymer falling within the prior art disclosure, namely, the copolymer of tetrafluoroethylene and propylene, wherein the units derived from tetrafluoroethylene predominate, exhibits rubber-like character. Apart from this publication, there has not been any recognition that rubber-like copolymers can be derived from tetrafluoroethylene and olefins when units of the former were present in any proportion. Nor has there been prior art recognition that any of such copolymers can be secured to elastomers.

It is an object of the present invention to provide new elastomers having a high weight proportion of fluorine. A further object is to provide a process for obtaining these new elastomers. A still further object is to provide specific copolymer compositions from which the new elastomers can be prepared. Other objects will appear hereinafter.

Whereas the prior art broadly discloses copolymers of tetrafluoroethylene with such olefins as ethylene, propylene, butylene, and isobutylene, as well as with numerous other ethylenically unsaturated compounds, it has now been discovered that copolymers of certain combinations of the aforementioned olefins when combined in certain proportions, although they may range from semi-solids to rubber-like products, may be converted to elastomers. More specifically, the copolymers which are convertible to elastomers consist essentially of tetrafluoroethylene units and olefin units in the mole ratio of about 1:06–1.2, with the olefin units being selected from the group consisting of (a) from 50–100 mole percent of units selected from the group consisting of propylene, butene-1, and mixtures thereof and with the remainder of said olefin units being selected from the group consisting of ethylene and isobutylene, and (b) ethylene and isobutylene in about a 1:1 molar proportion. The tetrafluoroethylene and olefin units are combined in a substantially linear and almost alternating sequence, whereby the mole fraction for each of these basic components is about 0.5.

Copolymers of the above compositions can be cured to elastomers with free-radical generators, such as organic peroxides, preferably using the procedures described in U.S. Pat. No. 2,958,672. Alternatively additional monomers which can conveniently be called cure-site monomers may be added in small amounts to the copolymerization mixture which monomers incorporate such groups as —COOH which can be cross-linked with metal oxides such as magnesia or calcium oxide; reactive halogen which can be cross-linked with amines; such as β-haloalkyl vinyl ethers including β-chloroethyl vinyl ether; a compound containing a non-polymerizable carbon-to-carbon double bond which can be cross-linked with sulfur. Examples of such additional compounds are disclosed in U.S. Pat. No. 2,468,664 at col. 9, lines 36–54; 3,093,621; and 3,306,879. The amount of such compounds required will depend on the specific compound selected and the elastic properties desired in the final product; generally, no greater than 5 mole percent of units derived from the additional monomer will be needed in the copolymer. It should be understood that the elastic character of these copolymers is derived primarily from the particular combinations of tetrafluoroethylene and olefin units, and that therefore, the present discovery is not limited to specific methods or incorporation of other monomers for curing purposes. Such methods or monomers may, however, enhance or provide a desired property such as would the —COOH groups, as provided by acrylic acid for example, which would enhance adhesion of the vulcanizates to metals.

It is significant to note that the particular olefins upon which the prior art appears to dwell, viz ethylene and isobutylene, cannot be the sole olefins present along with tetrafluoroethylene, except as described. The known copolymer products of either with tetrafluoroethylene cannot be cured to elastomers. It is surprising that a mixture of the olefins of this invention in the prescribed proportion will yield copolymers which are curable to elastomers. Further surprising is the fact that some of these copolymers are elastomers even prior to curing and subsequent curing provides enhanced elasticity.

The current ASTM definition (Publication No. 184, 1959), describes an elastomer as "a substance that can be stretched at room temperature to at least twice its original length and, after having been stretched and the stress removed, returns with force to approximately its original length in a short time."

A definition of an elastomer which is applicable to the materials described herein is that an elastomer is a material capable of recovering quickly, forcibly and substantially completely from deformation resulting from stress below its yield value. An elastomer is, or can be modified to be, essentially insoluble (but can swell) in boiling aromatic solvents such as benzene. In this state, at room temperature, free of diluents, it retracts within one minute to less than 1.5 times its original length after being stretched to twice its length and held for one minute.

It is important that the molar ratio of about 1:0.8–1.2 for the tetrafluoroethylene units to olefin units be observed if an elastomer in the above defined sense is to be obtained. The copolymers of the present invention and the cured products obtained therefrom exhibit high heat stability and solvent resistance. A higher proportion of olefin derived units than specified detracts from these properties.

Higher ratios of tetrafluoroethylene to olefin units up to about i.e., about 1:0.6 also yield useful products which can be converted to elastomers by pre-stretching to an extension close to but below the yield limit, preferably at or about room temperature. The copolymers containing higher ratios of TFE/olefin units become molecularly oriented in the stretching process, and the molecularly oriented polymers thus obtained exhibit elastomeric (anisotropic) properties in the sense defined above. With still higher proportions of tetrafluoroethylene the percent set obtained on extension approaches the total extension, and the products are oriented fibers which are not appreciably elastomeric.

The copolymers of the invention are made by conventional methods well known to those skilled in the art. In one convenient method, the monomers to be polymerized and the initiator, in the presence of an inert liquid medium, are heated from about 35° C. to about 160° C. in a closed shaker tube under moderate superatmospheric pressures, e.g., about 300–2500 p.s.i. (pounds per square inch) (ca. 20–170 atmospheres), the pressure being created and maintained by injecting water into the system.

Conventional free-radical initiators such as peroxides, azonitriles, and metal and ammonium persulfates, can be used as initiators. Organic-soluble initiators (i.e., initiators soluble in typical organic solvents) particularly organic peroxides such as benzoyl peroxides, tert-butyl peroxypivalate, and tert-butyl peroxide are suitable. The temperature will of course be determined largely by the particular initiator used. Water, lower alkanols, and lower carboxamides such as dimethylacetamide, together with mixtures thereof, can be used as inert media. Lower alkanols, e.g., ethyl alcohol, isopropyl alcohol, and tert-butyl alcohol, are particularly suitable, especially when mixed with water. When a liquid medium other than pure water, is used, its composition of course will change during the process as more water is injected to create and maintain the desired pressure.

The preferred processes for preparing the copolymer of this invention are well-known free-radical emulsion polymerizations. Thus, water soluble persulfates are the preferred catalysts, sodium bisulfite is preferred if an activator is used, sodium phosphate dibasic heptahydrate is a suitable buffer, and the salts of perfluoroacids, for example, ammonium perfluoro-n-octanoate are preferred as surfactants. Preferred temperatures are in the range of 50°–90° C., and preferred pressures in the range of 500 to 2200 p.s.i.g.

The inherent viscosity, a measure of the molecular weight of the copolymers, may vary widely, provided it is sufficiently high to permit vulcanization to useful elastic products. In general, if the inherent viscosity is about 0.01 or higher (measured at 30° C. as a solution of 1 gram of copolymer in 100 ml. of 1,1,2-trichloro-1,2,2-trifluoroethane), vulcanization to an elastic product is assured As the inherent viscosity increases from 0.01, the copolymers become increasingly tough, changing from soft semi-solids to non-flowing materials which resemble uncured natural and synthetic rubbers. Usually, it is intended that the copolymers of this invention should be fabricable into various useful articles by the conventional techniques of the rubber industry. That is, they are to be mixed with various vulcanizing agents as well as fillers and reinforcing agents on two-roll rubber mills, or equivalent devices, and subsequently shaped and vulcanized by heating under pressure in a mold, or shaped by extrusion and cured by heating in an oven. In any case, these various standardized fabrication procedures can be used readily when the inherent viscosity of the copolymers is between about 0.3 and 3.0, and this constitutes the preferred range of inherent viscosity.

The following examples, in which parts and percents are by weight unless otherwise indicated, are intended merely to describe specific embodiments of the present invention and not as a limitation on its scope.

EXAMPLE 1

To a 400 ml. silver-lined pressure vessel is charged under a gaseous nitrogen blanket 200 ml. deaerated distilled water; 1.1 gm. ammonium persulfate; 3.0 gm. sodium phosphate dibasic heptahydrate, 0.25 gm. sodium bisulfite; 0.15 gm. ammonium perfluoro-n-octanoate; and 0.5 gm. of tert-butyl acrylate. The vessel is closed, cooled to Dry Ice/acetone bath temperature and evacuated to less than 1 mm. mercury pressure. There is introduced 15.6 gm. of propylene and 38.3 gm. of tetrafluoroethylene. Under agitation the vessel is heated to 60° C. and the pressure is gradually built up to 2000 p.s.i.g. by injecting additional water. The polymerization is conducted at 60° C. under 2000 p.s.i.g. pressure for 4 hours. The vessel is cooled to room temperature, and the latex discharged. The white polymer product is isolated by freeze-coagulating the latex, washing the solid polymer with water several times, and drying it overnight in a vacuum oven at 90° C. The polymer is soluble in 1,1,2-trichloro-1,2,2-trifluoroethane which is commercially available as "Freon 113." Infrared spectral analysis shows a strong band at 5.8 microns, indicating the presence of tertiary butyl acrylate in the polymer.

A 1.00 gm. sample of the polymer product is heated for 5 minutes at 160° C. to eliminate isobutylene and liberate carboxyl groups. The resulting acidic copolymer is dissolved in 80 ml. of "Freon 113" and titrated with 0.1807 N alcoholic KOH to a phenolphthalein end-point. 2.0 ml. of the KOH solution is required, which corresponds to the presence of 1.57% by weight of units derived from acrylic acid in the heated copolymer of 2.79% by weight of units derived from t-butyl acrylate in the original polymer product.

The fluorine content of the polymer product is 49.9% by weight.

From these two analyses, the composition of the polymer product is calculated as: 45.7 mole precent units derived from terafluoroethylene, 52.7 mole precent from propylene and 1.7 mole percent from t-butyl acrylate.

EXAMPLE 2

To a 400 ml. silver-lined pressure vessel is charged under a gaseous nitrogen blanket, 200 ml. deaereated distilled water; 1.1 gm. ammonium persulfate; 3.0 gm. sodium phosphate dibasic heptahydrate; 0.25 gm. sodium bisulfite; and 0.15 gm. ammonium perfluoro-n-octanoate. The vessel is closed, cooled to Dry Ice/acetone bath temperature, and evacuated to less than 1 mm. mercury pressure. There is introduced 49 gm. of tetrafluoroethylene, and 12 gm. of propylene. Under agitation, the vessel is heated to 60° C. and under pressure of 2125 p.s.i.g. is polymerized for 4 hours. The vessel is cooled to room temperature and the product is isolated as described in Example 1. The yield of tetrafluoroethylene-propylene dipolymer is 43.3 grams. The fluorine content of the dipolymer is 57.3% by weight which corresponds to a dipolymer having the composition 56.0 mole percent units derived from tetrafluoroethylene and 44 mole percent from propylene.

A sample of the dipolymer is compounded on a 2-roll rubber mill according to the following weight proportions:

| | |
|---|---|
| Polymer | 100 |
| Magnesium oxide | 10 |
| Metaphenylene-bismaleimide | 3 |
| Precipitated silica filler | 15 |
| Dibenzoyl peroxide | 4 |

The compound stock is molded under pressure for 2 hours at 110° C. When tested at room temperature, the vulcanized compound has a tensile strength of 950 p.s.i., an elongation at break of 310%, and a permanent set of 34%.

EXAMPLE 3

This example illustrates the heat stability of a copolymer of the present invention. The procedure of Example 2 is repeated except that 50 gms. of tetrafluoroethylene and 11 gms. of propylene are used and the pressure is 1800–2500 p.s.i.g.

The dipolymer, isolated as described above, has an inherent viscosity of 1.0, measured in "Freon 113" at a concentration of 1 gram per 100 ml. at 30° C. Its fluorine content is 53.3% by weight which corresponds to a dipolymer having a composition of 50 mole percent units derived from tetrafluoroethylene and 50 mole percent from propylene.

This dipolymer, when heated in an air oven at 288° C. for 72 hours loses only 11% by weight.

EXAMPLE 4

This example illustrates the chemical and solvent resistance of a copolymer of the present invention. The procedure of Example 2 is repeated except that 49.5 gms. of tetrafluoroethylene and 11.5 gms. of propylene are used; the pressure is 2000 p.s.i.g. and the temperature is 50° C.

After isolating the dipolymer product as described above, it has an inherent viscosity of 0.49 as measured above.

The uncured polymer is unaffected by boiling 10% aqueous sodium hydroxide. At approximately 110° C., the uncured polymer is darkened, but otherwise unaffected by concentrated sulfuric acid. At about 100° C. the uncured polymer is practically unaffected by immersion in "Skydrol" 500, a phosphate ester fluid.

EXAMPLE 5

The procedure of Example 2 is repeated except that 50.0 g. of tetrafluoroethylene and 12.0 g. of propylene are used and the maximum presure is 700 p.s.i.g. for 8 hours. The yield of tetrafluoroethylene-propylene dipolymer is 25.0 grams. The inherent viscosity of the dipolymer is 1.086. Its fluorine content is 52.7% by weight which corresponds to a composition of 49.0 mole percent units derived from tetrafluoroethylene and 51.0 mole percent from propylene.

EXAMPLE 6

The procedure of Example 2 is repeated except that 34.2 g. of tetrafluoroethylene and 12.0 g. of propylene are used and the maximum presure is 580 p.s.i.g. for 4 hours. The yield of tetrafluoroethylene-propylene dipolymer is 15.0 grams. The fluorine content of the dipolymer is 51.7% by weight which corresponds to a composition of 47.5 mole percent units derived from tetrafluoroethylene and 52.5 mole precent propylene.

EXAMPLE 7

The procedure of Example 2 is followed except with the exceptions that (1) the monomers charged are tetrafluoroethylene, ethylene, and propylene, in amounts of 43.1 gm., 2.8 gm., and 10 gm., respectively (equivalent to a mole ratio of tetrafluoroethylene/propylene/ethylene of 1/0.58/0.23), and (2) the polymerization pressure is built-up by water injection to 1800–2000 p.s.i.g. The yield of isolated terpolymer is 22 gms. It is insoluble in aliphatic and aromatic hydrocarbons, aliphatic ketones, methylene chloride, triethyl amine, and ethylene diamine.

A sample of the polymer is compounded and cured as described in Example 2. The vulcanized elastomer has a tensile strength of 1850 p.s.i., and elongation at break of 240%, and a permanent set of 10%.

The inherent viscosity of the terpolymer is 1.12 as measured above. Its fluorine content is 53.4% by weight, corresponding to a terpolymer having 70.2% by weight of units derived from tetrafluoroethylene and, taking the average molecular weight of the olefin components as 35, this indicates the terpolymer to contain about 45 mole percent of units derived from tetrafluorethylene.

The procedure above is repeated except that the mole ratio of tetrafluoroethylene/propylene/ethylene charged to the shaker tube is 1/0.33/0.42. A hard, powdery terpolymer product is obtained.

EXAMPLE 8

A 400 ml. stainless steel-lined shaker tube is charged with 0.3 gm. of benzoyl-peroxide, 1 gm. of acrylic acid, 100 ml. of tert-butyl alcohol, and 100 ml. of distilled deoxygenated water. The tube is cooled in a Dry Ice/acetone bath, evacuated, and charged with 60 gm. of tetrafluoroethylene and 25 gm. of propylene. Water is injected into the shaker tube and the tube is heated with shaking to 80° C. under an internal pressure of about 2100 p.s.i.g. A pressure of 1900–2100 p.s.i.g. is maintained by water injection as needed, over a 12 hour period. The tube and contents are cooled, volatile materials are vented off, and the tube is opened. The solid copolymer is washed in a Blendor with methanol, filtered, and dried. The copolymer contains 51.5% fluorine and has a neutral equivalent of 4980 as determined by titrating a 1% solution in hot tetrachloroethylene with 0.01 M methanolic sodium hydroxide using a phenolphthalein indicator. This analysis corresponds to a tetrafluoroethylene/propylene/acrylic acid content (by mole percent) of about 46.8/51.8/1.4. The copolymer is soluble in "Freon 113." One hundred parts of the copolymer and 10 parts of magnesium oxide are milled together on a 2-roll rubber mill. The mixture is vulcanized in a mold under pressure for 30 minutes at 140° C., removed from the mold, cooled to room temperature and tested. The vulcanizate is insoluble in "Freon 113." It has a tensile strength of 820 p.s.i., elongation at break of 150%, and a permanent set at break of 7%.

EXAMPLE 9

A 400 ml. stainless steel-lined shaker tube is charged with 0.3 gram of benzoyl peroxide, 1.0 gram of acrylic acid, 100 ml. of t-butyl alcohol, and 100 ml. of distilled deoxygenated water. The tube is cooled in a Dry Ice/acetone bath, evacuated, and charged with 60 grams of tetrafluoroethylene and 30 grams of 1-butene. Water is injected into the shaker tube, and the tube is heated with shaking so that at 80° C. the internal pressure is 2100 p.s.i. Heating at 80° C. is continued for 12 hours and pressure is maintained at 1900–2100 p.s.i. by additional water injection as needed. The tube and contents are cooled, volatile materials are vented off, and the tube is opened. The residual, solid, air-dried polymer is soluble in hot and cold tetrahydrofuran. The product contains 43.7% fluorine by weight and has a neutral equivalent of 1710 as determined by titrating a 1% solution in hot tetrachloroethylene with 0.01 M methanolic sodium hydroxide using a phenolphthalein indicator. These analyses correspond to a tetrachloroethylene/1-butene/acrylic acid content (by mole percent) of about 43.6/51.9/4.5.

EXAMPLE 10

A 400 ml. stainless steel-lined shaker tube is charged with 0.3 gm. of benzoyl peroxide and 200 ml. of distilled deoxygenated water. The tube is cooled in a Dry Ice/acetone bath, evacuated, and charged with 60 gm. of tetrafluoroethylene, 20 gm. of isobutylene, and 10 gm. of ethylene. Water is injected into the shaker tube, and the tube is heated with shaking so that at 80° C. the internal pressure is 2100 p.s.i. Heating at 80° C. is continued for 12 hours and pressure is maintained at 1900–2100 p.s.i. by additional water injection as needed. The tube and contents are cooled, volatile materials are vented off, and the tube is opened. The tough, solid polymer contains 49.3% fluorine by weight and is soluble in "Freon 113" solvent. A sample of the polymer is compounded on a 2-roll rubber mill according to the following weight proportions:

| | |
|---|---|
| Polymer | 100 |
| Magnesium oxide | 15 |
| Medium thermal carbon black | 20 |
| Metaphenylene-bismaleimide | 2 |
| Dibenzoyl peroxide | 3 |

The compounded stock is soluble in "Freon 113" solvent. A strip of the cured stock is warmed to 45° C., stretched to twice its original length, and held in this condition for 1 minute. When the stress is removed, the strip retracts 70% in 5 seconds, and 75% in 60 seconds. The compounded stock is molded and vulcanized under pressure for 2 hours at 130° C. It is swollen by "Freon 113" solvent, but no longer dissolves.

EXAMPLE 11

A 400 ml. silver-lined shaker tube is charged with 0.3 gm. of benzoyl peroxide and 100 ml. of distilled deoxygenated water. The tube is cooled in a Dry Ice/acetone bath, evacuated, and charged with 60 gm. of tetrafluoroethylene and 26 gm. of propylene. The procedure of Example 9 is then followed until the polymer is obtained. The solid dipolymer is a rubbery solid and is identified by its infrared spectrum as follows:

| | Intensity | |
|---|---|---|
| | Copolymer of this example | Copolymer of Example 3 |
| Wavelength (μ): | | |
| 3.35 | Strong | Strong. |
| 6.26 | do | Do. |
| 6.90 | do | Do. |
| 7.11 | do | Do. |
| 7.18 | do | Do. |
| 7.85 | do | Do. |
| 7.92 | do | Do. |
| 8.10 | do | Do. |
| 8.45 | Very strong | Very strong. |
| 8.87 | do | Do. |
| 9.15 | do | Do. |
| 9.64 | do | Do. |
| 9.75 | do | Do. |
| 10.43 | Strong | Strong. |
| 10.94 | do | Do. |
| 11.50 | Medium | Medium. |
| 12.35 | do | Do. |
| 15.08 | Strong | Strong. |

This spectral analysis is practically identical with the spectral analysis of the copolymer of Example 3 thereby indicating that the copolymer of the present example is essentially of the same composition.

EXAMPLE 12

Two preparations of dipolymer made by the procedure of Example 11 are blended together and analyzed for fluorine. The product has 49.3% by weight fluorine, which corresponds to a dipolymer having a composition of about 46.3 mole percent of units derived from tetrafluoroethylene.

EXAMPLE 13

A 1.4 l. stainless steel, high pressure autoclave is flushed with oxygen-free nitrogen and then is charged with 800 ml. distilled water, 30.4 g. of trisodium phosphate ($Na_3PO_4 \cdot 12H_2O$), 18.2 g. ammonium persulfate and 2.0 g. sodium perfluoro-n-octanoate. The reaction mixture is stirred and heated to 60° C. A mixture of tetrafluoroethylene and propylene in 2:1 mole ratio is fed continuously into the autoclave through a compressor until the pressure in the autoclave reaches 600 p.s.i.g. Ten grams of 0.24 M sodium bisulfiate solution is then added by pressure injection. This addition of bisulfite solution is repeated every 30 minutes throughout the rest of the run. When the autoclave pressure reached 600 p.s.i.g., the monomer feed mixture is changed to 1:1 in mole ratio. The rate of the monomer feed is adjusted such that the autoclave pressure is maintained at 600 p.s.i.g. throughout the run. The temperature is maintained at 60° C. After a total reaction time of 5½ hours, the polymerization mixture is discharged. The dipolymer is isolated by freeze-coagulation using Dry Ice/acetone mixture, washed several times with water in a Blendor and dried overnight in a vacuum oven at 100° C. The yield of dipolymer is 533 grams. The fluorine content of the dipolymer is 54.7% by weight which corresponds to 51.5 mole percent of units derived from tetrafluoroethylene. The dipolymer is pressed for 5 minutes into clear, transparent elastic slabs at 110° C. in a laboratory press. A ¼" strip of the pressed stock is stretched at room temperature to twice its original length and held under elongation for one minute. Upon the release of the stress, the strip retracts 85% in 15 sec. and 95% in one minute.

EXAMPLE 14

Preparation of tetrafluoroethylene/propylene/2-chloroethyl vinyl ether terpolymer by a continuous process The recipe and the polymerization conditions for a typical run are shown in the following table:

Monomer feeds:
    Tetrafluoroethylene (TFE) _ 150 g. (1.5 moles)/hr.
    Propylene (P) _____ 37.8 g. (0.9 mole)/hr.
    2 - chloroethyl vinyl ether (CIEVE) _____ 5 ml. (0.047 mole)/hr.

Catalysts:
    Solution A fed at the rate of 400 ml./hr.—
        Ammonium persulfate __ 0.05 M.
        Trisodium phosphate $12H_2O$ _____ 0.05 M.
        Sodium lauryl alcohol sulfate _____ 1.5%.
    Solution B fed at the rate of 70 ml./hr.—
        Sodium bisulfite _____ 1.0%.

Reactor volume=1.6 l.
Polymerization temperature=60° C.
Polymerization pressure=600 p.s.i.g.

All recipe ingredients are fed into an autoclave with continuous overflow through a "Mity-Mite" valve set at 600 p.s.i.g. into a gas-liquid separator. The gaseous monomer feeds, TFE and propylene, are metered with rotameter, mixed and fed through a compressor which is kept at about 80° C. to avoid liquification of the monomers. The liquid monomer, 2-chloroethyl vinyl ether, as well as catalyst solutions A and B are fed separately. The latex thus obtained contains approximately 30% polymer solids. The product is isolated by freeze-coagulation, followed by filtration, water-washing and oven-drying. The terpolymer contains 55.0 mole percent TFE, 43.2 mole percent propylene and 1.8 mole percent 2-chloroethyl vinyl ether. It has an inherent viscosity of 0.71 (measured as 0.1% in Freon–113 at 30° C.).

PROPERTIES OF TETRAFLUOROETHYLENE/ PROPYLENE/2-CHLOROETHYL VINYL ETHER TERPOLYMER (1) Vulcanizate properties

| | |
|---|---|
| Polymer | 100 |
| Magnesium oxide | 15 |
| MT carbon black | 20 |
| Tetraethylene pentamine | 1.5 |
| Press-cure, 1 hr. at ° C | 180 |
| Post-cure, 24 hrs. at ° C | 200 |
| Tensile at break, p.s.i. | 2500 |
| Modulus at 100% elongation, p.s.i. | 850 |
| Elongation at break, p.s.i. | 190 |
| Hardness, Shore A | 68 |
| Yerzley resilience at 100° C. | 66 |
| Compression set after 70 hrs. at 121° C., percent | 20 |

(2) Heat resistance—Physical properties after aging at 200° C. for 7 days

| | |
|---|---|
| $T_B$, p.s.i. | 2940(+18) |
| $M_{100}$, p.s.i. | 700(−18) |
| $E_B$, percent | 210(+10) |
| Hardness, Shore A | 71(+3) |
| Yerzley resilience, 100° C. | 73(+3) |
| Compression set after 70 hrs. at 121° C., percent | 18(−2) |

The figures in parentheses are percent change from the originals shown in Table 1 of vulcanizate properties.

(3) Fluid resistance

| | Percent volume increase [1] |
|---|---|
| ASTM oil No. 3 [2] | 5 |
| Cyclohexane | 6 |
| Conc. $H_2SO_4$ | 5 |
| 70% $HNO_3$ | 10 |
| 46% NaOH | 5 |
| Skydrol 500 | 5 |
| Acetone | 64 |
| Methyl ethyl ketone | 83 |
| Ethyl acetate | 105 |
| Glacial acetic acid | 84 |
| Methanol | 5 |
| Ethylene diamine | 6 |
| Pyridine | 20 |
| Dimethyl formamide | 7 |
| Tetrahydrofuran | 146 |

[1] After exposing 1″ x 0.5″ x 0.075″ strips for 7 days at room temperature percent volume increase=

$$\frac{(\text{Final length})^3 - (\text{Original length})^3}{(\text{Original length})^3} \times 100$$

[2] Defined in ASTM test method D–471–59T.

(4) Water resistance: Exposed 7 days in boiling water

| | Percent Volume Increase | Hardness Change | Compression Set Change |
|---|---|---|---|
| MgO-loaded | .5 | +2 | +26 |
| PbO-loaded | 1.7 | −2 | +6 |
| No metal oxide | 3.9 | −3 | +2 |

(5) Gum stock properties

| | |
|---|---|
| Polymer | 100 |
| Tetraethylene pentamine | 2 |
| Press-cure, 1 hr. at ° C | 180 |
| Post-cure, 24 hrs. at ° C | 200 |
| $T_B$, p.s.i. | 1500 |
| $M_{100}$, p.s.i. | 250 |
| $E_B$, percent | 340 |
| Hardness, Shore A | 52 |
| Yerzley resilience, 100° C. | 79 |
| Compression set after 70 hrs. at 100° C. | 15 |

EXAMPLE 15

The procedure of Example 13 is followed with the exceptions that (1) the catalyst solution charged is consisted of 900 ml. distilled water, 13.5 g. disodium hydrogen phosphate heptahydrate, 5.0 g. ammonium persulfate and 0.7 g. ammonium perfluoro-octanoate. (2) A 0.12 M sodium bisulfite solution (28 g.) is charged into the reactor by pressure injection when the reactor pressure reaches 500 p.s.i.g. (3) The total reaction time is 300 min. The yield of isolated dipolymer is 198 gms. It is 70% soluble in Freon-113. The fluorine content of the soluble portion is 62.2% by weight which corresponds to 65.5% tetrafluoroethylene. The inherent viscosity of the soluble portion is 0.65 measured in "Freon-113" at a concentration of 0.5 gm. per 100 ml. at 30° C. A sample of the soluble dipolymer is pressed into a thin slab at 110° C. in a laboratory press. A ¼″ strip of the pressed stock is stretched at room temperature to twice its original length and held under elongation for one minute. Upon release of the stress the strip slowly retracts 50% in one minute. The same strip is stretched to six times its original length and held under elongation for one minute. Upon release of the stress, the strip slowly retracts 200% in one minute. A 1″ bench mark was made on the above stretched strip. It is stretched to 2″ between the bench marks and held under elongation for one minute. Upon release of the stress, the strip retracts 75% in one minute.

EXAMPLE 16

A terpolymer of tetrafluoroethylene (57 mole percent); propylene (40.8 mole percent); and 2-chloroethylvinylether (2.2 mole percent) is prepared in accordance with the process of Example 14.

A solution of the terpolymer is prepared by shaking together in a closed container at room temperature for about 40 hours, 10 parts of terpolymer, 78 parts of 1,1,2-trichloro-1,2,2-trifluoroethane, and 0.4 part of methanol. A clear solution is obtained which may be poured readily and used for casting films or coating substrates. The fluid solution may also be mixed with fillers, curing agents and the like before the casting or coating operations, if it is desired to modify the physical properties of the terpolymer. After controlled evaporation of the solvent, the terpolymer films have similar properties to films prepared by conventional dry processing.

Another solution of the terpolymer is prepared as above except the shaking time is about 60 hours and no methanol is used. This composition is a non-pourable, clear, gel, which may be useful if high-viscosity is desired, such as for spreading over substrate, or for compounding in a churn.

As many widely different embodiments of this invention may be made without departing from the spirit and scope thereof, it is to be understood that this invention is not limited to the specific embodiments thereof except as defined in the appended claims.

We claim:
1. As a composition of matter, copolymers consisting essentially of tetrafluoroethylene units, olefin units and cure-site units, the molar ratio of the said tetrafluoroethylene units to the said olefin units being about 1:0.6–1.2 said olefin units being selected from the group consisting of (a) from 50 to 100 mole percent of said olefin units selected from the group consisting of propylene, butene-1 and mixtures thereof, and from 0–50 mole percent of said olefin units selected from the group consisting of ethylene and isobutylene and (b) ethylene and isobutylene in about 1:1 molar proportion with respect to each other, said cure-site units being present in an amount of from 0–5 mole percent of said composition.

2. Composition of claim 1 in which the said cure-site units are acrylic acid units.

3. The cured product of claim 2.

4. Composition of claim 1 in which the said cure-site units are 2-chloroethyl vinyl ether units.

5. The cured product of claim 4.

6. As a composition of matter, copolymers of tetrafluoroethylene units, propylene units and cure-site units, the mole ratio of tetrafluoroethylene units to propylene units being about 1:0.6–1.2, said cure-site units being present in an amount of from 0.5 mole percent.

7. Composition of claim 6 in which the said cure-site units are acrylic acid units.

8. The cured product of claim 7.

9. Composition of claim 6 in which the said cure-site units are 2-chloroethyl vinyl ether units.

10. The cured products of claim 9.

11. As a composition of matter, copolymers consisting essentially of tetrafluoroethylene units and olefin units in the mole ratio of about 1:0.8–1.2 with the olefin units being selected from the group consisting of (a) from 50 to 100 mole percent of said olefin units selected from the group consisting of propylene, butene-1 and mixtures thereof and from 0 to 50 mole percent of said olefin units selected from the group consisting of ethylene and isobutylene and (b) ethylene and isobutylene in about a 1:1 molar proportion with respect to each other.

12. As a composition of matter, copolymers consisting essentially of tetrafluoroethylene units and olefin units in the mole ratio of about 1:0.8–1.2 with the olefin units being selected from the group consisting of from 50 to 100 mole percent propylene units and from 0 to 50 mole percent of ethylene units.

13. As a composition of matter, copolymers consisting essentially of tetrafluoroethylene units and propylene units in the mole ratio of about 1:0.8–1.2.

14. As a composition of matter, copolymers consisting essentially of tetrafluoroethylene units and olefin units in the mole ratio of about 1:0.8–1.2, with the olefin units being ethylene and isobutylene in about 1:1 molar proportion with respect to each other.

References Cited

UNITED STATES PATENTS

| | | | |
|---|---|---|---|
| 3,318,854 | 5/1967 | Honn et al. | 260—87.7 |
| 3,306,879 | 2/1967 | Pattison | 260—77.5 |

OTHER REFERENCES

Journal of Polym. Sci., Part A, 2, 2235–43 (1964).
Industrial & Eng. Chem., 47, 1006–1012 (1955).

JOSEPH L. SCHOFER, Primary Examiner

STANFORD M. LEVIN, Assistant Examiner

U.S. Cl. X.R.

260—41, 80.8, 80.78, 80.81, 87.5

UNITED STATES PATENT OFFICE
CERTIFICATE OF CORRECTION

Patent No. 3,467,635　　　　　　　　Dated SEPTEMBER 16, 1969

Inventor(s) BRASEN & CLEAVER

It is certified that error appears in the above-identified patent and that said Letters Patent are hereby corrected as shown below:

In Claim 6, Col. 10, line 61: "0.5 mole percent" should read -- 0 - 5 mole percent --.

SIGNED AND SEALED

DEC 23 1969

(SEAL)
Attest:

Edward M. Fletcher, Jr.
Attesting Officer

WILLIAM E. SCHUYLER, JR
Commissioner of Patents